(12) United States Patent
Dey et al.

(10) Patent No.: US 9,646,077 B2
(45) Date of Patent: May 9, 2017

(54) TIME-SERIES ANALYSIS BASED ON WORLD EVENT DERIVED FROM UNSTRUCTURED CONTENT

(71) Applicant: TATA CONSULTANCY SERVICES LIMITED, Mumbai, Maharashtra (IN)

(72) Inventors: Lipika Dey, Gurgaon (IN); Ishan Verma, Gurgaon (IN); Arpit Khurdiya, Gurgaon (IN); Diwakar Mahajan, Gurgaon (IN); Gautam Shroff, Gurgaon (IN)

(73) Assignee: TATA CONSULTANCY SERVICES LIMITED (IN)

( * ) Notice: Subject to any disclaimer, the term of this patent is extended or adjusted under 35 U.S.C. 154(b) by 260 days.

(21) Appl. No.: 14/328,172

(22) Filed: Jul. 10, 2014

(65) Prior Publication Data
US 2015/0019513 A1    Jan. 15, 2015

(30) Foreign Application Priority Data

Jul. 11, 2013 (IN) .......................... 2339/MUM/2013

(51) Int. Cl.
*G06F 17/30* (2006.01)
*G06Q 10/10* (2012.01)

(52) U.S. Cl.
CPC .. *G06F 17/30613* (2013.01); *G06F 17/30156* (2013.01); *G06Q 10/10* (2013.01)

(58) Field of Classification Search
USPC ................ 707/607, 609, 687, 705, 790, 821
See application file for complete search history.

(56) References Cited

U.S. PATENT DOCUMENTS 8,874,409 B2 * 10/2014 Dhurandhar ............ G06F 17/18
702/179

* cited by examiner

*Primary Examiner* — Sana Al Hashemi
(74) *Attorney, Agent, or Firm* — Barnes & Thornburg LLP (57) ABSTRACT

The present subject matter relates to analysis of time-series data based on world events derived from unstructured content. According to one embodiment, a method comprises obtaining event information corresponding to at least one world event from unstructured content obtained from a plurality of data sources. The event information includes at least time of occurrence of the world event, time of termination of the world event, and at least one entity associated with the world event. Further, the method comprises retrieving time-series data pertaining to the entity associated with the world event from a time-series data repository. Based on the event information and the time-series data, the world event is aligned and correlated with at least one time-series event to identify at least one pattern indicative of cause-effect relationship amongst the world event and the time-series event.

15 Claims, 4 Drawing Sheets

TIME-SERIES ANALYSIS BASED ON WORLD EVENT DERIVED FROM UNSTRUCTURED CONTENT

PRIORITY CLAIM

This patent application claims priority to Indian Patent Application No. 2339/MUM/2013, filed 11 Jul. 2013, the disclosure of which is incorporated herein by reference in its entirety.

TECHNICAL FIELD

The present subject matter relates, in general, to data analytics, and, in particular, to a system and a method for analyzing time-series data based on world events derived from unstructured content.

BACKGROUND

Numerical serial data emerging from large volumes of structured data like weekly sales figures, daily stock-prices, monthly or weekly market-share, rise or fall in customer-satisfaction indices, etc., is known to influence enterprise decision making and strategy creation. Such numerical serial data is typically presented in the form of time-series, where the X axis stands for time and the Y axis stands for the data, such as stock price, volume of transactions, degree of change, or other values. Taking an example of a stock price, such a chart can depict the changes in the stock price as they occur over time. Such numerical serial data presented in the form of time-series is commonly referred to as time-series data.

Successful enterprise decision making, however, largely depends on decision makers' capability to assess the environment around which is likely to influence business in a major way. The signals to be caught from the environment may be related to world politics, global or regional economic policies, competition landscape, socio-political changes in different parts of the world, actions by major stake-holders, and so on. Most of these signals can be usually obtained from unstructured data like News, blogs, market reports and social media, which contains wealth of information that can contribute significantly towards interpretation of structured data, when fused with structured data in a meaningful way.

BRIEF DESCRIPTION OF THE DRAWINGS

The detailed description is described with reference to the accompanying figure(s). In the figure(s), the left-most digit (s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Conventionally, few techniques have been implemented for linking unstructured data, for example, related to world events, with time-series data. The existing techniques link the world events to the time-series data based on common named entities or a best matched entity, and merely provide an explanation of the time-series data in view of the world events. Such conventional techniques fail to correlate the world events and time-series data to derive cause and effect relationship between the world events and time-series data to obtain meaningful insights therefrom.

In accordance with the present subject matter, a system and a method for analysis of the time-series data based on the world events derived from unstructured content are described. According to one embodiment, unstructured content is obtained from a plurality of data sources. In the context of the present subject matter, the term unstructured content refers to documents like Company reports or proposals, etc., written in one of several known formats, news articles, and social-media content, such as posts on social media websites, discussions on various blogs and forums. The data sources include World Wide Web (Web) including company website, news websites, blogs, forums, social media websites, or various internal or external data repository containing news or similar information.

The unstructured content, thus, obtained is pre-processed to extract relevant information or information components therefrom, and then the unstructured content is processed to identify world events and to extract event information corresponding to those world events therefrom.

The pre-processing, in one implementation, involves extracting meta-data associated with the unstructured content representing attributes of the unstructured content, de-duplicating the unstructured content, grouping similar content, etc. The processing, in one implementation, involves tokenization of the unstructured content into sentence and words, tagging words with post-script tags, extracting phrases from the sentences, identifying verbs from the sentences, identifying entities in the sentences, extracting relations between those entities, extracting world events, etc. The entities as referred herein may be understood as actors or perpetrators of the world event or as objects that are impacted by the world event.

The processing, in one implementation, may further include assigning a class to the world event amongst several predefined classes, and associating additional meta-data with the unstructured content. For example, an event identifier (ID) associated with a world event to uniquely identify the world event. The pre-processing and the processing of the content have been explained in detail in the forthcoming sections.

As a result of the processing, world events and event information associated with the world events is obtained. The event information may include time of occurrence of the event which is the time at which the world event was first reported by the data sources, time at which the world event was last reported by the data sources, entities associated with the events, a class assigned to the world event, etc.

Subsequent to identification of the world events and event information, time-series data corresponding to world events is obtained from a time-series data repository. In one implementation, the time-series data, which is numerical serial data may be collated and stored in a time-series data repository for data analysis. In one example, the time-series data is processed and then stored in the time-series data repository. The processing of the time-series data may include identifying entities in the time-series data or associating entities to the time-series data, extracting time-series events from the time-series data, assigning a unique identifier to each of the time-series events, identifying time of occurrence of the time-series event, identifying duration of the time-series events, etc. The time-series data obtained after processing may be stored in the time-series data repository.

In one implementation, time-series data corresponding to one or more entities associated with the world events are obtained from the time-series data repository. The event information corresponding to the world events is then aligned and correlated with the time-series data to identify one or more patterns that are repetitive instances of the correlation. Such patterns are indicative of cause and effect relationships between the world events and time-series data, and such patterns can be used for performing data analytics activities including, but not limited to, predicting further time-series events, monitoring the world events, predicting the world events, and risk assessment of the time-series event and/or world events on the operation of the enterprise.

The system and the method, thus, facilitate integrated analysis of structured and unstructured data in the context of an Enterprise. The system and the method integrates the qualitative information derived through the world events to interpret the behavior of time-series numerical data (also referred to as quantitative data) like sales figures or market share or customer acquisition, etc., to analyze a cause and effect of the world events on the time-series data. Such an analysis provides meaningful insights into the time-series data and helps in performing data analytics activities, such as predicting future time-series events, risk assessment and monitoring of the time-series data and/or world events.

The following disclosure describes the system and the method for analyzing time-series data based on world events derived from unstructured content in greater detail. While aspects of the described method and the system can be implemented in any number of different computing systems, environments, and/or configurations, embodiments for analyzing time-series data based on world events derived from unstructured content are described in the context of the following exemplary method(s) and system(s).

Figure 1:
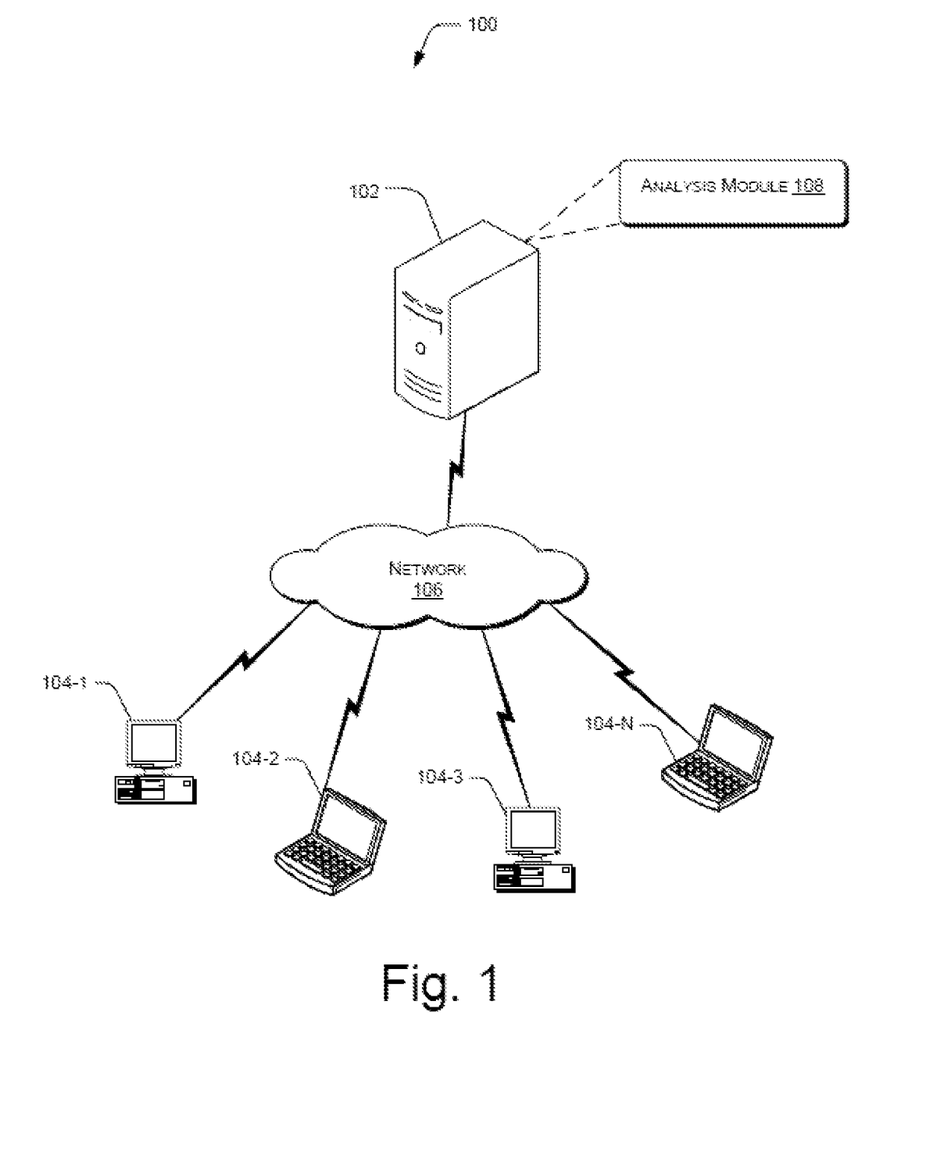
FIG. 1 illustrates a network environment implementing a data analytics system, according to an embodiment of the present subject matter.

FIG. 1 illustrates a network environment 100 implementing a data analytics system 102, in accordance with an embodiment of the present subject matter.

In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones.

The data analytics system 102 (hereinafter referred to as system 102) is communicatively connected to a plurality of user devices 104-1, 104-2, 104-3 . . . , and, 104-N, collectively referred to as user devices 104 and individually referred to as a user device 104, through a network 106. In one implementation, a plurality of users may use the user devices 104 to communicate with the system 102.

The system 102 and the user devices 104 may be implemented in a variety of computing devices, including, servers, a desktop personal computer, a notebook or portable computer, a workstation, a mainframe computer, a laptop and/or communication device, such as mobile phones and smart phones. Further, in one implementation, the system 102 may be a distributed or centralized network system in which different computing devices may host one or more of the hardware or software components of the system 102.

The system 102 may be connected to the user devices 104 over the network 106 through one or more communication links. The communication links between the system 102 and the user devices 104 are enabled through a desired form of communication, for example, via dial-up modem connections, cable links, digital subscriber lines (DSL), wireless, or satellite links, or any other suitable form of communication.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, for providing a link between the system 102 and the user devices 104. The network devices within the network 106 may interact with the system 102, and the user devices 104 through the communication links.

According to the present subject matter, the system 102 obtains event information corresponding to world events derived from unstructured content obtained from a plurality of data sources. The event information may include time of occurrence of the world events, time when the world event was last reported by the data sources, entities associated with the world events, a class (referred to as an event class hereinafter) pre-assigned to the world event. The event information may further information like event ID which is a unique identifier assigned to each world event, etc.

The event information corresponding to the world events is then analyzed and aligned and correlated with corresponding time series data to identify cause and effect of the world events on the time series data. For this purpose, the system 102 is provided with an analysis module 108 that obtains the event information and retrieves the time-series data corresponding to the world events from an enterprise repository, namely, a time-series data repository (not shown in this figure) associated with the system 102. The analysis module 108 then analyzes and aligns and correlates the retrieved time-series data with the world events to identify one or more patterns that are indicative of cause-effect relationship between the world events and the time-series data. Based on the cause-effect relationship, one or more data analytics activities including monitoring time-series events, predicting future time-series events, and risk assessment of the operation of the enterprise may be performed. The analysis module 108, in one example, performs the alignment and correlation using a machine learning system (not shown in the figure) operating over a conventional learning method, for example, a random forest method. The manner in which the unstructured content is obtained from the data sources, content is processed, aligned, and correlated with structured content is described in greater detail in the forthcoming section.

Figure 2A:
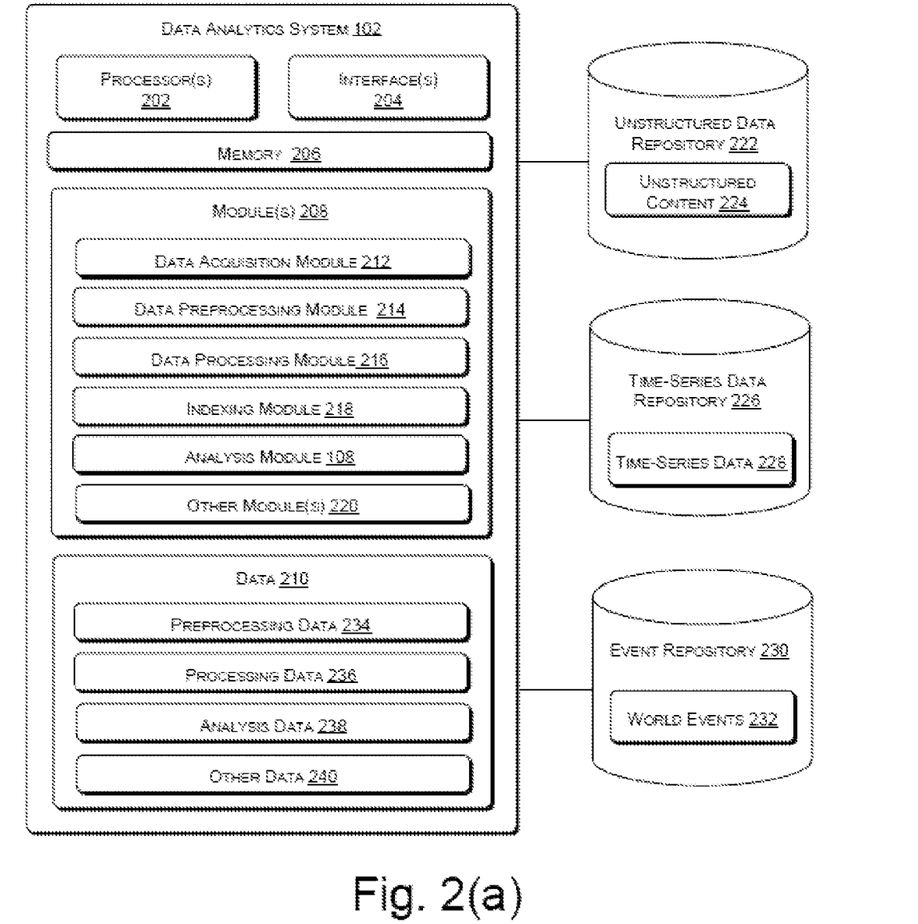
FIG. 2(a) illustrates components of the data analytics system, according to an embodiment of the present subject matter.
Figure 2B:
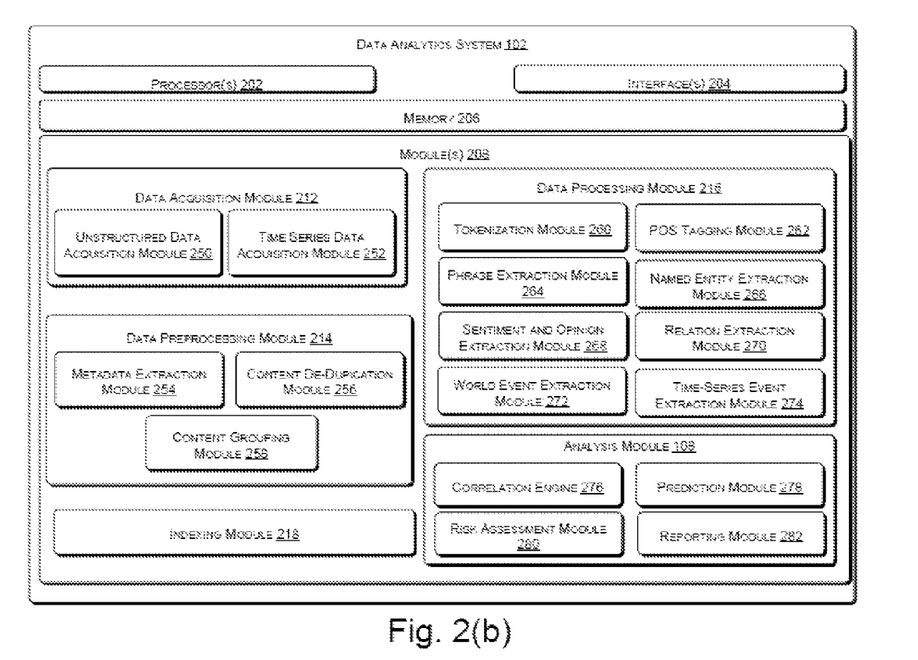
FIG. 2(b) illustrates components of the data analytics system, according to another embodiment of the present subject matter.

FIG. 2(a) illustrates various components of the system 102, according to an embodiment of the present subject matter, and FIG. 2(b) illustrates various components of the system 102, according to another embodiment of the present subject matter.

According to the embodiment shown in FIG. 2(a), the system 102 includes one or more processor(s) 202, interfaces 204, and a memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions and data stored in the memory 206.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

The interface(s) 204 may include a variety of software and hardware interfaces, for example, interface for peripheral device(s), such as a keyboard, a mouse, an external memory, and a printer. Further, the interface(s) 204 may enable the system 102 to communicate over the network 106, and may include one or more ports for connecting the system 102 with other computing devices, such as web servers and external databases. The interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes. The system 102 also includes module(s) 208 and data 210.

The module(s) 208 include routines, programs, objects, components, data structures, etc., which perform particular tasks or implement particular abstract data types. The module(s) 208 further include, in addition to the analysis module 108, a data acquisition module 212, a data pre-processing module 214, a data processing module 216, indexing module 218, and other module(s) 220.

The data 210 serves, amongst other things, as a repository for storing data processed, received and generated by one or more of the modules 208. The data 210 includes pre-processing data 234, processing data 236, analysis data 238, and other data 240. The other data 240 includes data generated as a result of the execution of the other module(s) 220.

The system 102 may be further connected to a plurality of other data repositories including an unstructured data repository 222 for storing the unstructured content 224, a time-series data repository 226 for storing time-series data 228, and an event repository 230 for storing world events 232, and time-series events.

According to one embodiment, the data acquisition module 212 acquires unstructured content 224 from a plurality of heterogeneous data sources including news sources, internal repositories of consumer feedbacks, blogs and discussion forums or also from social-media like Twitter™, Facebook™, etc. In one example, the data acquisition module 212 may be a web crawler. In one implementation, the data acquisition module 212 stores the unstructured content 224 in the unstructured data repository 222. The data acquisition module 212 further retrieves time-series data 226 from structured content stored in enterprise internal data repositories, emails, etc., and stores the time-series data 228 in the time-series data repository 226.

According to another embodiment depicted in the FIG. 2(b), the data acquisition module 212 may include an unstructured data acquisition module 250 and a time-series data acquisition module 252. According to said embodiment, the unstructured data acquisition module 250 extracts the unstructured content from the plurality of data sources, and the time-series data acquisition module 252 extracts the time-series data from the structured content obtained from internal data sources.

The unstructured content obtained from the heterogeneous data sources is then pre-processed by the data pre-processing module 214. In one implementation, as a part of the preprocessing, the data preprocessing module 214 identify the duplicates or near-duplicates, and groups them together. Further, the data preprocessing module 214 groups the similar content into groups. Each of the groups are assigned with attributes determined from the unstructured data and providing information like in how many unique data sources the unstructured content appears, first occurrence time and location of the unstructured content, total buzz count of the content, total number or comments or replies associated with the content. In one implementation, the data preprocessing module 214 extracts meta-data associated with the unstructured content representing attributes of the unstructured content.

According to another embodiment depicted in the FIG. 2(b), the data preprocessing module 214 may include a metadata extraction module 254 for extracting metadata from the unstructured content 224, a content de-duplication module 256 for de-duplicating the unstructured content 224, and a content grouping module 258 for grouping similar content.

Subsequent to the data pre-processing, the unstructured content and the time-series data, thus, obtained, is processed by the data processing module 216. As a part of the processing, the data processing module 216 is configured to tokenize the unstructured content into sentence and words, and tag the words with post-script tags based on, for example, extracting phrases from the sentences, identifying verbs from the sentences, identifying entities in the sentences, extracting relations between those entities, extracting world events, etc. As mentioned previously, the entities may be actors or perpetrators of the world event or as objects that are impacted by the world event. The data processing module 216 is further configured to assign a class to the world event amongst several predefined classes, and associates additional meta-data other than the meta-data extracted from the unstructured content with the unstructured content. For example, an event identifier (ID) associated with a world event by the data processing module 216 to uniquely identify the world event.

The data processing module 216 may characterize the world events based on building a complete description of a world event with information extracted and collated from one or more data sources. The world events as referred herein can be understood as reported activities along with their associated actors also known as key players or entities, time and place of occurrence and also possible information about effect, impact, precedence, consequence or relationships to other events. For characterizing the world events, the data processing module 216 may classify the events into a plurality of predefined classes, say, VerbNet classes. In one example, the data processing module 216 may classify the world events into "relevant" or "irrelevant", a relevant event may be further classified as a "competitor event" or a "company event" or at an even finer grain as a "people event" or a "promotional event" or "market news". A world event may be classified into more than one classes using VerbNet.

As a part of the data processing, the world events and time-series events are extracted by the data processing module 216. A world-event is extracted from unstructured content and contains information about a specific action or activity indicating an occurrence or a happening at a particular time-instance. A world-event event can also be associated to a possibly empty set of entities, a location, a significance value and an impact. The entities associated to an event may be further classified as actors or perpetrators of the action or as objects who are impacted by the event. A time-series event is characterized by a deviation in observed behavior of a measurable variable from its expected behavior. Time-series events are observed while tracking specified measurable quantities like sales, stock-market value, etc. Simple time-series events can be defined in terms of rise or fall of the value or as deviations from expected value that has been predicted by a model.

More complex events can be defined as functions of state-changes over time or as functions of multiple time-series. For example, while defining a stock-market deviation event for a company we have made use of stock values of the sector as a whole tracked over a defined time-period, rather than looking at isolated values. As a result of the data processing, world events and event information associated with the world events is obtained. Further, time-series events and associated time-series data is obtained.

According to another embodiment depicted in the FIG. 2(b), the data processing module 216 may include a tokenization module 260 for tokenizing the unstructured content, a POS tagging module 262 for tagging the sentences and words with post script tags, a phrase extraction module 264 for extracting phrases from the sentences, and a named entity extraction module 266 for extracting entities in the sentences. Further, the data processing module 216 may include a sentiment and opinion extraction module 268 to extract the sentiments or opinions from the sentences, a relation extraction module 270 to extract the relations between the entities, world event extraction module 272 to extract world events from the unstructured content, and a time-series event extraction module 274 to extract time-series events from the time-series data.

In one implementation, a world event may be represented in the following manner:
(Event-ID, SourceDocument, Date, EventClass, Entities, EventType)
Where, Event-ID—Unique identifier assigned to the event;
SourceDocument—Names of News Sites or Enterprise Reports reporting the event;
Date—Date at which the event has been reported for the first time;
EventClass—Class assigned to the event;

Entities—Entities Associated to the event including Names of People, Place, Organization, Money Value, Email Address, telephone number, Address etc. extracted by standard Named Entity Recognizer from the underlying sentence. Some of these entities may be part of Subject, predicate or object also; and EventType—Event types are functions of domain knowledge and business knowledge. A generic event which is of interest to all organizations is appointment or attrition of people in controlling positions like CEO, CTO etc. Acquisition of another company, involvement in a legal issue, announcing price-hike for its products etc. are other event types. Event types can be learnt using machine-learning techniques like classification. Events of interest to a specific sector like automobile sector could be recalling of a particular model of vehicle or failing a safety-test by a model etc.

A set of events may be hand-tagged by experts and provided as training samples to the data analytics system 102, which may identify a classifier from such examples. The world event extraction module 272 may then apply the classifier to future event instances to determine their types.

In said implementation, a time-series event may be represented in the following manner:
(Event-ID, Entities, Date, Deviation Value, DeviationType)
Where, Event-ID—Unique Identifier assigned to the event;
Entities—Entities Associated to the event including Names of People, Place, Organization, Money Value, Email Address, telephone number, Address etc.;
Date—Date at which the event has been reported for the first time;
DeviationValue—Deviation in the rank indicative of sales volume or stock value of entities over a time period T; and
DeviationType—Deviation type is inferred from deviation values. For example, an upward movement of rank is termed as a RISE whereas downward movement of rank is termed as a FALL. Further deviation in rank by more than 3 positions can be classified as drastic change as opposed to a rank change by one or two positions.

Subsequent to the data processing, the analysis module 108 of the system 102 is configured to align and correlate the world events with the time-series events to identify one or more patterns indicative of cause-effect relationships between the world events and the time-series events. These cause-effect relationships may form the basis of performing data analytics activities. In one implementation, the analysis module 108 aligns and correlates the world events with the time series events based on the date and the entity values. In one example, a pattern may indicate rise or fall in the sales or stock value of an entity, whenever a particular world event is reported.

In one implementation, correlations may be maintained temporarily through a discrete set of predefined time intervals which also reflect the relationship between the indicators and the consequence. A sample set of pre-defined time intervals include "today", "yesterday", "last one week", "last fort-night", "last one month", "immediately before", "immediately after", "next week", "next fort-night", "next one month", etc.

In one implementation, output of the alignment may be in the form of attributed relation tables. Such attribute relation tables can be later analyzed for frequent associations and possible identification of indicators and consequences or causes and effects. The alignments, thus, identified are provided as an input to a machine learning system (not shown in the figure) coupled to the system 102, and operating over a conventional learning method, for example, a random forest method to train the machine learning system to learn the patterns or the cause-effect relationships between the world events and the time series events. Once trained, the machine learning system can be used for identifying such patterns or cause-effect relationships between future world events and time series events.

Further, in addition to the pattern, anomalies that represent a deviation from normal behavior from predicted behavior can be identified by the analysis module 108. In one implementation, the world events, the time-series events and the identified patterns can be linked by the indexing module 218 to facilitate information retrieval. The indexing module 218 may also link the unstructured source documents and associated meta-data with the world events, and the time-series data with the patterns or anomalies extracted from it to enable efficient information retrieval. The indexing unit can also be employed to index pattern correlation data, reports, etc.

As indicated previously, the cause-effect relationships identified after the correlation may be used to perform data analytics activities. The data analytics may include predicting future time-series values. The data analytics activity may further include computing risk potential based on predicted values. The output also contains confidence values that the system associates with the risk. A typical risk-reporting template comprises a set of causal events, estimated risk elements in the form of time-series patterns or anomalies, along with the estimated type and impact of the effect can be generated. In one implementation, the analysis module 108 may generate reports about the analysis, past events, frequencies, system use, system performance, etc.

Figure 3:
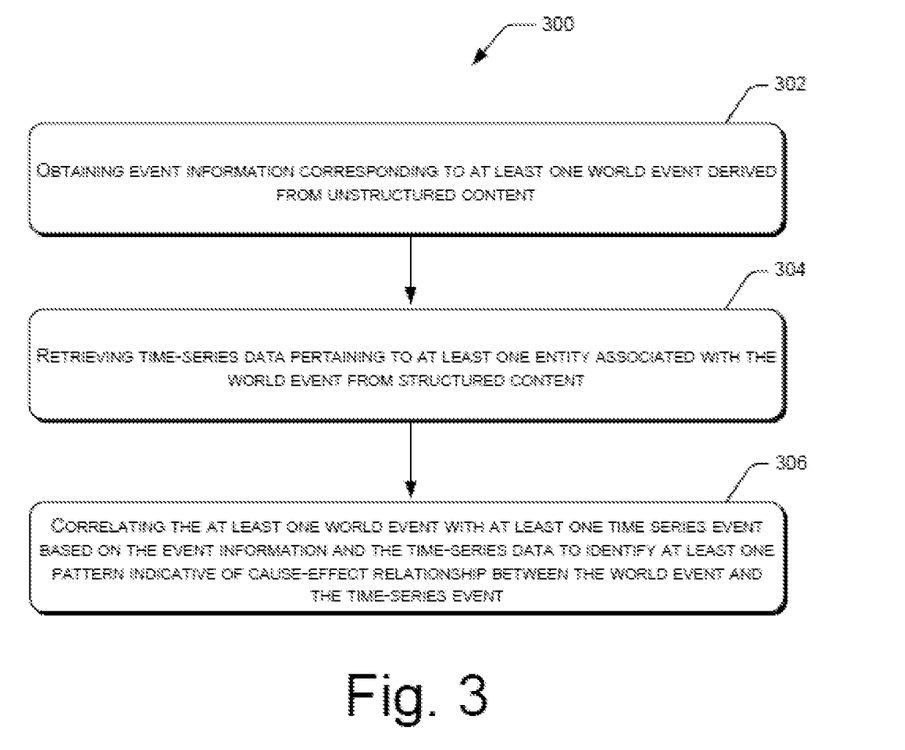
FIG. 3 illustrates a method for analyzing time-series data based on world events derived from unstructured content, according to an embodiment of the present subject matter.

FIG. 3 illustrates a method 300 of analyzing time-series data based on world events derived from unstructured content, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or alternative methods. Additionally, individual blocks may be deleted from the methods without departing from the spirit and scope of the subject matter described herein. Furthermore, the method 300 can be implemented in any suitable hardware, software, firmware, or combination thereof.

Referring to FIG. 3, at block 302, the method 300 includes obtaining event information corresponding to at least one world event derived from unstructured content. The unstructured content may include news, articles, publications, reports, etc. The unstructured content may be obtained from a plurality of data sources including web internal repositories of an enterprise. The event information as referred herein may include a unique event ID associated with the world event, time of occurrence of the event, last time when the event was reported by the data sources, one or more entities associated with the event, and a class pre-assigned to the event. In one implementation, the analysis module 108 is configured to obtain the event information corresponding to the world event.

At block 304, the method includes retrieving time-series data pertaining to the at least one entity associated with the world event from a structured content. In one implementation, the analysis module 108 is configured to obtain the time-series data pertaining to the at least one entity associated with the world event from a time series data repository.

At block 306, the method includes correlating the world event with a time-series event to identify at least one pattern indicative of cause-effect relationship between the world event and the time-series event. Such a relationship helps in performing data analytics activities, such as prediction of the future time series events, risk assessment for the enterprise, etc. In one implementation, the correlation is established between the world event and the time series event based on date and entity values of the world event and the time-series event. Such correlations are then learned by the machine learning system to identify future cause-effect relationships between the world events and the time-series events.

As already described, the system and the method acquire data from multiple heterogeneous sources and automate the process of knowledge discovery through correlation of information components extracted from the data. The system and the method correlate information components extracted from heterogeneous sources, and supports event-based contextual correlation of information extracted from both structured and unstructured data. The system and the method can be envisaged as an evolutionary analytics platform that can learn to perform causal analytics through implicit learning from human-interactions and feedbacks. Causal analytics on time-series data in conjunction with current events may lead to predictive and risk-assessment models.

Although embodiments for analyzing time-series data based on world events derived from unstructured content have been described in language specific to structural features and/or methods, it is to be understood that the invention is not necessarily limited to the specific features or methods described. Rather, the specific features and methods are disclosed as exemplary implementations of analyzing time-series data based on world events derived from unstructured content.

We claim:

1. A computer-implemented method for analyzing time-series data based on world events derived from unstructured content obtained from a plurality of data sources, the method comprising:

extracting, by a processor, from the unstructured content, a plurality of world events comprising at least one world event by:
  obtaining, by the processor, a meta-data associated with the unstructured content, wherein the meta-data is indicative of attributes of the unstructured content;
  de-duplicating, by the processor, the unstructured content based on the obtained meta-data associated with the unstructured content; and
  grouping, by the processor, similar unstructured content into a plurality of groups, wherein the unstructured content present in each of the plurality of groups corresponds to a world event;

obtaining, by the processor, event information corresponding to the at least one world event from the unstructured content, wherein the event information includes at least time of occurrence of the at least one world event, time of termination of the at least one world event, at least one entity associated with the at least one world event, and a pre-assigned event class;

retrieving, by the processor, time-series data pertaining to the at least one entity associated with the at least one world event, from a time-series data repository; and aligning, by the processor, the at least one world event with at least one time-series event based on the event information and the time-series data, to identify at least one pattern indicative of a cause-effect relationship between the at least one world event and the at least one time-series event.

2. A computer implemented data analytics system comprising
a processor;
an analysis module coupled to the processor, to:
extract from an unstructured content, a plurality of world events comprising at least one world event by:
obtaining a meta-data associated with the unstructured content, wherein the meta-data is indicative of attributes of the unstructured content;
de-duplicating the unstructured content based on the obtained meta-data associated with the unstructured content; and
grouping similar unstructured content into a plurality of groups, wherein the unstructured content present in each of the plurality of groups corresponds to a world event;
obtain event information corresponding to the at least one world event from the unstructured content stored in an unstructured data repository, wherein the event information includes at least time of occurrence of the at least one world event, time of termination of the at least one world event, and at least one entity associated with the at least one world event;
receive, time-series data pertaining to the at least one entity associated with the at least one world event, from a time-series data repository; and
align, the at least one world event with at least one time-series event based on the event information and the time-series data, to identify at least one pattern indicative of a cause-effect relationship between the at least one world event and the at least one time-series event.

3. A non-transitory computer-readable medium having embodied thereon a computer program for executing a method comprising:
extracting from an unstructured content, a plurality of world events comprising at least one world event by:
obtaining, by the processor, a meta-data associated with the unstructured content, wherein the meta-data is indicative of attributes of the unstructured content;
de-duplicating, by the processor, the unstructured content, based on the obtained meta-data associated with the unstructured content; and
grouping, by the processor, similar unstructured content into a plurality of groups, wherein the unstructured content present in each of the plurality of groups corresponds to a world event;
obtaining event information corresponding to the at least one world event from the unstructured content obtained from a plurality of data sources, wherein the event information includes at least time of occurrence of the at least one world event, time of termination of the at least one world event, at least one entity associated with the at least one world event, and a pre-assigned event class;

retrieving, time-series data pertaining to the at least one entity associated with the at least one world event, from a time-series data repository; and
aligning, the at least one world event with at least one time-series event based on the event information and the time-series data, to identify at least one pattern indicative of a cause-effect relationship between the at least one world event and the at least one time-series event.

4. The computer-implemented method as claimed in claim 1, wherein the method further comprising:
assigning a unique event identifier (ID) to each of the plurality of world events.

5. The computer-implemented method as claimed in claim 1, wherein the extracting further comprises:
tokenizing the unstructured content into a plurality of sentences and words;
tagging each word of the plurality of sentences with post script tags;
extracting one or more phrases from each of the plurality of sentences;
identifying verbs from each of the plurality of sentences based on the tagging and using a verb lexicon;
classifying verbs into a plurality of verb-classes based on a verb lexicon, wherein each of the verb-classes represents syntactically and semantically correlated verbs;
identifying entities in each of the plurality of sentences based on a named entity recognition technique; and
extracting relations involving at least one entity in each of the plurality of sentences based on a relation extraction technique.

6. The computer-implemented method as claimed in claim 1, wherein the method further comprises indexing the event information corresponding to the at least one world event with the time series data of the at least one time-series event and the at least one pattern.

7. The computer-implemented method as claimed in claim 1, wherein the method further comprises performing a data analytics activity based on the at least one pattern, the data analytics activity includes one of predicting at least one future time-series event, and evaluating an operational risk based on an impact of the at least one world event on the at least one time series event.

8. The computer-implemented method as claimed in claim 1, wherein the method further comprises linking the at least one world event with at least one pointer pointing to an original full text document from which the at least one world event is extracted.

9. The computer-implemented data analytics system as claimed in claim 2, wherein the data analytics system further comprises an indexing module to index the event information corresponding to the at least one world event with the time series data of the at least one time-series event and the at least one identified pattern to perform a data analytics activity.

10. The computer-implemented data analytics system as claimed in claim 2, wherein the analysis module performs a data analytics activity based on the at least one pattern, wherein the data analytics activity is one of prediction of at least one future time-series event based on the at least one pattern, and evaluation of an operational risk based on an impact of the at least one world event on the at least one time series event.

11. The non-transitory computer-readable medium as claimed in claim 3, wherein the method further comprising:
assigning a unique event identifier (ID) to each of the plurality of world events.

12. The non-transitory computer-readable medium as claimed in claim 3, wherein the extracting further comprises:
- tokenizing the unstructured content into a plurality of sentences and words;
- tagging each word of the plurality of sentences with post script tags;
- extracting one or more phrases from each of the plurality of sentences;
- identifying verbs from each of the plurality of sentences based on the tagging and using a verb lexicon;
- classifying verbs into a plurality of verb-classes based on a verb lexicon, wherein each of the verb-classes represents syntactically and semantically correlated verbs;
- identifying entities in each of the plurality of sentences based on a named entity recognition technique; and
- extracting relations involving at least one entity in each of the plurality of sentences based on a relation extraction technique.

13. The non-transitory computer-readable medium as claimed in claim 3, wherein the method further comprises indexing the event information corresponding to the at least one world event with the time series data of the at least one time-series event and the at least one pattern.

14. The non-transitory computer-readable medium as claimed in claim 3, wherein the method further comprises performing a data analytics activity based on the at least one pattern, the data analytics activity includes one of predicting at least one future time-series event, and evaluating an operational risk based on an impact of the at least one world event on the at least one time series event.

15. The non-transitory computer-readable medium as claimed in claim 3, wherein the method further comprises linking the at least one world event with at least one pointer pointing to an original full text document from which the at least one world event is extracted.

* * * * *